(12) United States Patent
Hisamatsu et al.

(10) Patent No.: US 9,094,631 B2
(45) Date of Patent: Jul. 28, 2015

(54) CONTROL DEVICE CONNECTABLE TO A DATA RECORDING DEVICE, METHOD OF CONTROLLING THE SAME, AND NON-TRANSITORY COMPUTER-READABLE STORAGE MEDIUM

(75) Inventors: Yutaka Hisamatsu, Ueda (JP); Yasuhiro Takeuchi, Sakaki-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 22 days.

(21) Appl. No.: 13/547,013

(22) Filed: Jul. 11, 2012

(65) Prior Publication Data

US 2013/0235401 A1    Sep. 12, 2013

(30) Foreign Application Priority Data

Mar. 9, 2012 (JP) .................. 2012-052624

(51) Int. Cl.
*H04N 1/387* (2006.01)

(52) U.S. Cl.
CPC .................... *H04N 1/3875* (2013.01)

(58) Field of Classification Search
CPC ... H04N 1/3875; H04N 1/3873; H04N 1/387; H04N 1/393
See application file for complete search history.

(56) References Cited

U.S. PATENT DOCUMENTS

| 7,173,718 B2 | 2/2007 | Iwata et al. | |
| 2004/0125395 A1* | 7/2004 | Onishi | 358/1.13 |
| 2004/0263887 A1* | 12/2004 | Kotani | 358/1.9 |
| 2006/0033940 A1* | 2/2006 | Miyata et al. | 358/1.9 |
| 2007/0024874 A1* | 2/2007 | Kawamura | 358/1.2 |
| 2007/0091330 A1* | 4/2007 | Kim et al. | 358/1.2 |
| 2008/0204778 A1* | 8/2008 | Koarai | 358/1.9 |
| 2009/0185209 A1* | 7/2009 | Yudasaka et al. | 358/1.9 |
| 2011/0122429 A1* | 5/2011 | Hirayama et al. | 358/1.11 |

FOREIGN PATENT DOCUMENTS

| JP | 2002023985 A | 1/2002 |
| JP | 2002373068 A | 12/2002 |
| JP | 2007047984 A | 2/2007 |
| JP | 2008269324 A | 11/2008 |
| JP | 2011165111 A | 8/2011 |

* cited by examiner

*Primary Examiner* — Hilina K Demeter
(74) *Attorney, Agent, or Firm* — Lowe Hauptman & Ham, LLP (57) ABSTRACT

[Problem]
To suppressing part of an image not being recorded even when the image to be recorded does not fit in an area defined by the top, bottom, left, and right margins set by an application.

[Solution]
If the size of the image to be recorded is larger than the application-specified area defined by the margins when image information including information denoting margins on cut-sheet paper is input from an application execution unit, the printer driver execution unit of the host computer virtually enlarges the positions of the sides of the cut-sheet paper, and generates and outputs to the printer a control command to record the image described by the image data in an enlarged area, which is an area defined by sides separated by the margin from the virtually enlarged sides.

3 Claims, 4 Drawing Sheets

CONTROL DEVICE CONNECTABLE TO A DATA RECORDING DEVICE, METHOD OF CONTROLLING THE SAME, AND NON-TRANSITORY COMPUTER-READABLE STORAGE MEDIUM

TECHNICAL FIELD

The present invention relates to a control device connectable to a recording device that can record on a recording medium, a method of controlling the control device, and a storage medium storing a program executed by a control unit that controls the control device.

BACKGROUND ART

Recording devices (printers) that record images in a recordable area (printable area), which is the largest area to which an image can be recorded on a recording medium, under the control of a control device (host computer) are known from the literature (see, for example, Patent Document 1).

When the control device records an image on the recording medium with the recording device, information about the image to be recorded on the recording medium is generally generated by a function of an application previously installed on the control device. Based on the image information generated by the application function, a control command for recording the image on the recording medium is then generated by a function of a previously installed printer driver, and is sent from the control device to the recording device. Note that the above recordable area is defined by the top, bottom, left, and right margins that are managed by the printer driver.

PRIOR ART DOCUMENTS

Patent Documents

[Patent document 1] Japanese Unexamined Patent Appl. Pub. JP-A-2008-269324

DISCLOSURE OF INVENTION

Problem to be Solved by the Invention

When the top, bottom, left, and right margins are also managed by the application, and not only by the printer driver, and images are recorded, the application execution unit may specify the top, bottom, left, and right margins. This can result in the top, bottom, left, and right margins set by the application being larger than the top, bottom, left, and right margins that are managed by the printer driver, an image not fitting in the area defined by the top, bottom, left, and right margins set by the application execution unit, and part of the image not being recorded.

The present invention is directed to the foregoing problem, and an object of the invention is to suppress part of an image not being recorded even when the image to be recorded does not fit in the area defined by the top, bottom, left, and right margins set by the application.

Means of Solving the Problem

To achieve the foregoing object, the invention is a control device that can connect to a recording device that records on a recording medium, and has an application execution unit that, to record an image on the recording medium by the recording device, outputs image information including at least information denoting a margin on the recording medium, and image data for an image to be recorded on the recording medium, by a function of a specific application; and a printer driver execution unit that, based on the image information input from the application execution unit, generates by a function of a printer driver a control command to record an image described by the image data in an application-specified area, which is an area defined by a side separated by a margin from a side of the recording medium, and outputs to the recording device; wherein if the size of the image described by the image data is greater than the application-specified area when the image information is input from the application execution unit, the printer driver execution unit virtually enlarges a position of a side of the recording medium, generates a control command to record the image described by the image data in an enlarged area, which is defined by a side separated by the margin from the virtually enlarged side, and outputs to the recording device.

If image information is input from the application execution unit for the recording device to record an image, and the image to be recorded will not fit in the application-specified area, which is the area defined by the top, bottom, left, and right margins managed by the application, the printer driver execution unit virtually enlarges the positions of the top, bottom, left, and right sides of the recording medium, and commands recording the image in an enlarged area, which is an area defined by sides separated by the top, bottom, left, and right margins from the virtually enlarged sides. As a result, the risk that part of the image will not be recorded can be reduced even when the image will not fit in the application-specified area by recording the image to an enlarged area that is larger than the application-specified area. More particularly, because in the process of calculating the enlarged area this aspect of the invention executes a process that does not change the values of the top, bottom, left, and right margins set by the application, the enlarged area can be appropriately calculated without executing a process that suitably changes the application settings of the top, bottom, left, and right margins for each of plural different applications, and utility is excellent.

The invention is also characterized by the printer driver execution unit virtually enlarging sides of the recording medium so that the enlarged area becomes an area corresponding to a recordable area, which is the largest area to which an image can be recorded on the recording medium.

This aspect of the invention can more effectively reduce the risk that part of the image will not be recorded because the enlarged area is made an area corresponding to the recordable area.

In another aspect of the invention, the recordable area is an area defined by margins managed by the printer driver; and the printer driver execution unit makes the enlarged area an area corresponding to the recordable area by virtually enlarging the sides of the recording medium amounts equal to the difference between the margin denoted by the image information input from the application execution unit, and the margin managed by the printer driver.

This aspect of the invention can make the enlarged area an area corresponding to the recordable area, and can improve processing efficiency, by using the uniform process of virtually enlarging the top, bottom, left, and right sides of the recording medium amounts equal to the difference between the top, bottom, left, and right margins set by the application execution unit, and the top, bottom, left, and right margins managed by the printer driver.

To achieve the foregoing object, another aspect of the invention is a method of controlling a control device that can connect to a recording device that records on a recording medium, and has an application execution unit that, to record an image on the recording medium by the recording device, outputs image information including at least information denoting a margin on the recording medium, and image data for an image to be recorded on the recording medium, by a function of a specific application; and a printer driver execution unit that, based on the image information input from the application execution unit, generates by a function of a printer driver a control command to record an image described by the image data in an application-specified area, which is an area defined by a side separated by a margin from a side of the recording medium, and outputs to the recording device; whereby when the image information is input from the application execution unit, the printer driver execution unit determines whether or not the size of the image described by the image data is greater than the application-specified area, and if the image is larger, virtually enlarges the positions of the sides of the recording medium, generates a control command to record the image described by the image data in an enlarged area, which is defined by sides separated by the margins from the virtually enlarged sides, and outputs to the recording device.

With this control method, the risk that part of the image will not be recorded can be reduced even when the image will not fit in the application-specified area by recording the image to an enlarged area that is larger than the application-specified area. More particularly, because in the process of calculating the enlarged area this aspect of the invention executes a process that does not change the values of the top, bottom, left, and right margins set by the application, the enlarged area can be appropriately calculated without executing a process that suitably changes the application settings of the top, bottom, left, and right margins for each of plural different applications, and utility is excellent.

Another aspect of the invention is a computer-readable storage medium storing a program that is executed by a control unit that controls a control device that can connect to a recording device that records on a recording medium, the program including steps of: outputting image information including at least information denoting a margin on the recording medium, and image data for an image to be recorded on the recording medium, to record an image on the recording medium by the recording device; based on the image information, generating a control command to record an image described by the image data in an application-specified area, which is an area defined by a side separated by a margin from a side of the recording medium, and outputting to the recording device; and if the size of the image described by the image data is greater than the application-specified area based on the image information, virtually enlarging a position of a side of the recording medium, generating a control command to record the image described by the image data in an enlarged area, which is defined by a side separated by the margin from the virtually enlarged side, and outputting to the recording device.

With this program, the risk that part of the image will not be recorded can be reduced even when the image will not fit in the application-specified area by recording the image to an enlarged area that is larger than the application-specified area. More particularly, because in the process of calculating the enlarged area this aspect of the invention executes a process that does not change the values of the top, bottom, left, and right margins set by the application, the enlarged area can be appropriately calculated without executing a process that suitably changes the application settings of the top, bottom, left, and right margins for each of plural different applications, and utility is excellent.

Effect of Invention

The invention can suppress part of an image not being recorded even when the image to be recorded does not fit in the area defined by the top, bottom, left, and right margins set by the application.

BEST MODE FOR CARRYING OUT THE INVENTION

A preferred embodiment of the invention is described below with reference to the accompanying figures.

Figure 1:
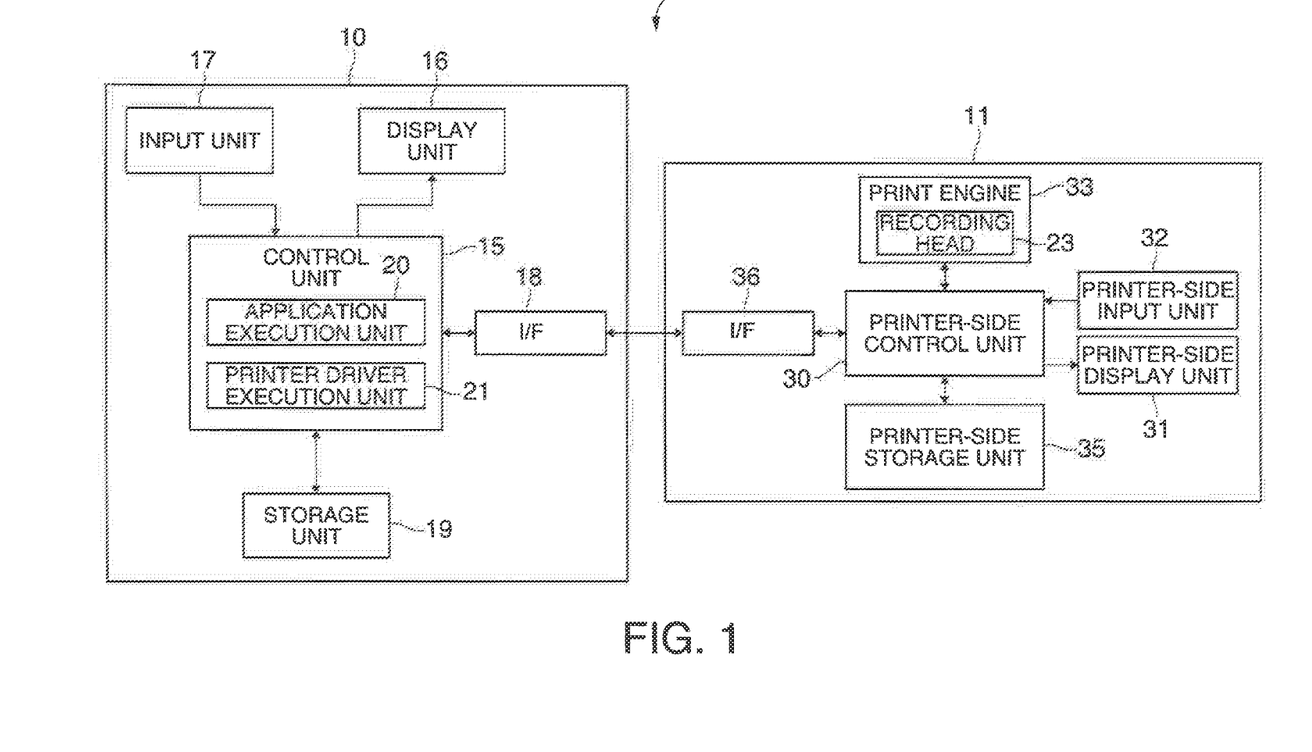
FIG. 1 is a block diagram showing the functional configuration of a recording system according to an embodiment of the invention.

FIG. 1 is a block diagram showing the functional configuration of a recording system 1 according to this embodiment.

The recording system 1 is a system that records images as controlled by a host computer 10 (control device) on cut-sheet paper used as the recording medium using a printer 11 (recording device) connected to the host computer 10.

As shown in FIG. 1, the host computer 10 has a control unit 15, display unit 16, input unit 17, interface unit 18 (I/F), and storage unit 19.

The control unit 15 includes a CPU, ROM, RAM, and other peripheral circuits, and centrally controls parts of the host computer 10. The control unit 15 includes an application execution unit 20 and a printer driver execution unit 21, which are described below. The display unit 16 has a display panel such as an LCD panel, and displays information on the display panel as controlled by the control unit 15. The input unit 17 is connected to various input devices, detects operation of these input devices, and outputs to the control unit 15. The interface unit 18 (I/F) communicates with the printer 11 according to a communication standard as controlled by the control unit 15. The storage unit 19 is a part that stores data rewritably, and includes a hard disk drive and a memory device such as EEPROM. A printer driver for controlling the printer 11 is stored in the storage unit 19.

The printer 11 is a recording device that has a recording head 23 and records images on cut-sheet media with the recording head 23. The recording head 23 may record using a thermal, inkjet, dot impact, laser, or any other recording method.

As shown in FIG. 1, the printer 11 includes a printer-side control unit 30, printer-side display unit 31, printer-side input unit 32, print engine 33, printer-side storage unit 35, and an interface unit 36 (I/F).

Like the above control unit 15, the printer-side control unit 30 includes a CPU, ROM, RAM, and other peripheral circuits, and centrally controls parts of the printer 11. The printer-side display unit 31 has a display panel such as an LCD panel or LEDs that display information such as the operating status of the printer 11, and displays information on the display panel or causes the LEDs to turn on/off in specific patterns as controlled by the printer-side control unit 30. The printer-side input unit 32 is connected to operating switches disposed to the printer 11, detects operation of the operating switches, and outputs operating signals to the printer-side control unit 30. In addition to the above recording head 23, the print engine 33 has a carriage for scanning the recording head 23 in the scanning direction, and a conveyance mechanism that conveys the cut-sheet paper. By reading and executing installed firmware, the printer-side control unit 30 controls the recording head 23 and other mechanisms to record on the cut-sheet paper based on control commands received from the host computer 10 while monitoring the detection states of various sensors. The interface unit 36 (I/F) communicates with the host computer 10 according to a communication standard as controlled by the printer-side control unit 30. The printer-side storage unit 35 includes nonvolatile memory such as EEPROM, and nonvolatilely stores data rewritably. Firmware for controlling operation of the printer 11 is stored in the printer-side storage unit 35.

The basic operation of the host computer 10 and the printer 11 when recording an image with the printer 11 is described next by describing the application execution unit 20 and printer driver execution unit 21.

The application execution unit 20 generates image information (described in detail below) including information about the image to be recorded on the cut-sheet paper and outputs to the printer driver execution unit 21 by executing an application previously installed on the host computer 10. The application could be a browser, word processing program, an image editing program, or a spreadsheet program, for example.

By running a printer driver previously installed on the host computer 10, the printer driver execution unit 21 generates and sends to the printer 11 control commands appropriate to the command language of the printer 11 based on the image information input from the application execution unit 20. The control commands are a set of commands causing the printer 11 to perform operations related to recording an image on cut-sheet paper, and include commands such as a command instructing recording an image, and a command controlling conveying cut-sheet paper.

The control commands sent from the host computer 10 to the printer 11 are sequentially stored in a receive buffer (not shown in the figure). The printer-side control unit 30 of the printer 11 controls the print engine 33 and performs the operations related to recording an image on the cut-sheet paper by sequentially reading and executing the control commands stored in the receive buffer using a function of the firmware.

The recordable area in this embodiment of the invention is described next.

Figure 2A:
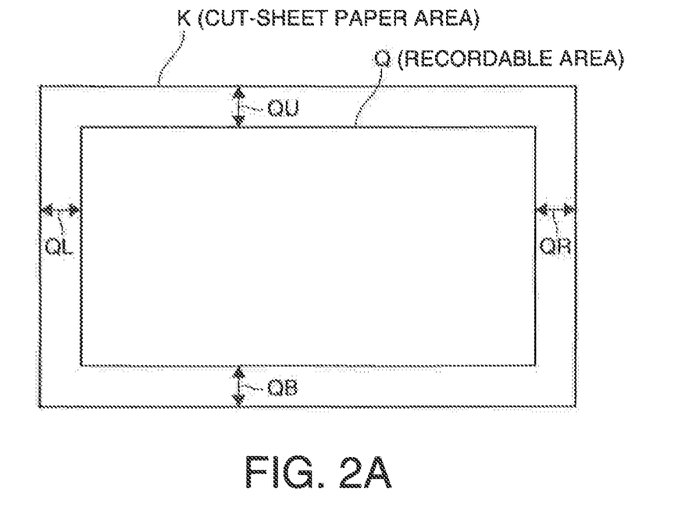
FIG. 2 is used to describe the recordable area and the application-specified area.

FIG. 2 (A) is used to describe the recordable area. In FIG. 2 (A), reference numeral K is the area schematically representing the entire area on the recording side of the cut-sheet paper (the "cut-sheet paper area" below), and reference numeral Q denotes the recordable area on the recording side of the cut-sheet paper. The cut-sheet paper area K and the recordable area Q are normally rectangular, and each is defined by four sides.

The recordable area Q is the largest area to which an image can be recorded in the cut-sheet paper area K, and more specifically is the area of the cut-sheet paper area K minus the top, bottom, left, and right margins that are managed by the printer driver. The sizes of these margins are written in a configuration file that can be referenced by the printer driver. The user can set the margins as desired through the user interface provided by a function of the printer driver. For clarity in the following description, the top, bottom, left, and right margins managed by the printer driver are the top driver margin QU, the bottom driver margin QB, the left driver margin QL, and the right driver margin QR.

The operation of the application execution unit 20 and printer driver execution unit 21 when recording an image on cut-sheet paper with the printer 11 is described next.

As described above, the application execution unit 20 outputs image information to the printer driver execution unit 21 to record an image on cut-sheet paper. This image information includes at least the image data for the image to be recorded on the cut-sheet paper, and information denoting the top, bottom, left, and right margins where image recording on the recording surface of the cut-sheet paper is prohibited.

Depending upon the type of application or the application settings, the application may control the top, bottom, left, and right margins separately from the top, bottom, left, and right margins managed by the printer driver. These margin values are written in a file that can be referenced by the application. The user can desirably set the sizes of these margins through the user interface provided by the application or a function of the operating system. For clarity in the following description, the top, bottom, left, and right margins managed by the application are the top application margin AU, the bottom application margin AB, the left application margin AL, and the right application margin AR. For convenience of description below, the application execution unit 20 according to this embodiment of the invention manages the top, bottom, left, and right margins, and outputs image information including information denoting those top, bottom, left, and right margins to the printer driver execution unit 21 when recording an image on cut-sheet paper.

The printer driver execution unit 21 to which the image information is input calculates the application-specified area (described below) and calculates coordinates identifying this area based on the content of the image information.

Figure 2B:
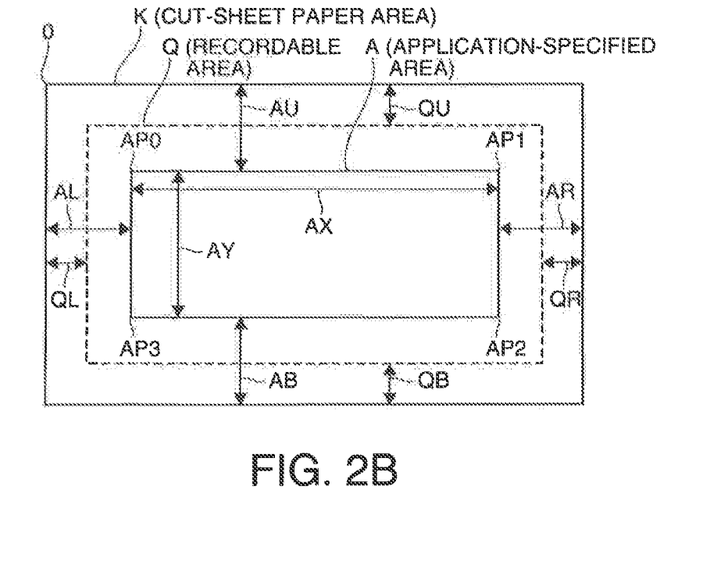

FIG. 2 (B) is used to describe the application-specified area. In FIG. 2 (B), reference numeral A denotes the application-specified area. The application-specified area A is the area defined by the top, bottom, left, and right margins that are managed by the application, and more specifically is the area of the cut-sheet paper area K minus the top application margin AU, bottom application margin AB, left application margin AL, and right application margin AR.

Based on the information indicating the margins AU, AB, AL, and AR contained in the image information input from the application execution unit 20, the printer driver execution unit 21 determines the relative position of the application-specified area A to the cut-sheet paper area K as shown in FIG. 2 (B). Next, the printer driver execution unit 21 determines the coordinates of the four corners APO, AP1, AP2, and AP3 of the application-specified area A in a virtual coordinate system of which the top left corner of the cut-sheet paper area K is the origin O. This virtual coordinate system is a coordinate system for defining the locations of dots that can be formed at a specific resolution in the cut-sheet paper area K, and all dots that can be formed in the cut-sheet paper area K are uniformly defined by the relative position from the position defined as the origin O in this coordinate system. The coordinates of the four corners AP0, AP1, AP2, and AP3 of the application-specified area A are the coordinates describing the application-specified area A.

The printer driver execution unit 21 then generates control commands, including the information denoting the coordinates of the four corners AP0, AP1, AP2, and AP3 of the identified application-specified area A, and the image data of the image to be recorded, for recording the image represented by the image data in the area defined by the coordinates of the four corners, and sends the control commands to the printer 11.

The printer-side control unit 30 of the printer 11 that receives the control commands appropriately manages the relationship between the virtual coordinate system and the recording surface of the cut-sheet paper. The printer-side control unit 30 writes the image data to the appropriate area in an image buffer not shown at the appropriate timing, and appropriately controls the print engine 33 based on the image data written to the image buffer to record on the cut-sheet paper, so that the image described by the image data is recorded in the area (=the application-specified area A) defined by the coordinates of the four corners in the virtual coordinate system.

Note that when recording an image to the application-specified area A, the printer-side control unit 30 records the image using one corner of the application-specified area A (the corner corresponding to corner AP0 in FIG. 2 (B)) as the origin. If the image will not fit in the application-specified area A, the portion that does not fit is not recorded. If the printer-side control unit 30 does not support a virtual coordinate system, the printer driver execution unit 21 performs the conversion from the virtual coordinate system to the physical coordinate system of the printer, and then generates commands for printer control. This accommodation is often required in small printers such as receipt printers in particular.

However, when the application and printer driver can each control the top, bottom, left, and right margins on the cut-sheet paper as in this embodiment, the following problem occurs.

Specifically, the sizes of the margins set by the application can be set as desired by the user, but when the margins set by the application are large relative to the margins set on the printer driver side, the application-specified area A can become unnecessarily small relative to the recordable area Q. In the example shown in FIG. 2 (B), the application margins AU, AB, AL, and AR are large relative to the printer driver margins QU, QB, QL, and QR. As a result, the application-specified area A is unnecessarily smaller than the recordable area Q. As described above, the printer driver execution unit 21 tells the printer 11 to record the image in the application-specified area A when recording an image on the cut-sheet paper. However, when the application-specified area A is unnecessarily small, part of the image will not be recorded when the image will not fit in the application-specified area A because the printer 11 does not record the part that does not fit.

The host computer 10 according to this embodiment of the invention therefore suppresses part of the image not being recorded by operating as follows.

Figure 3:
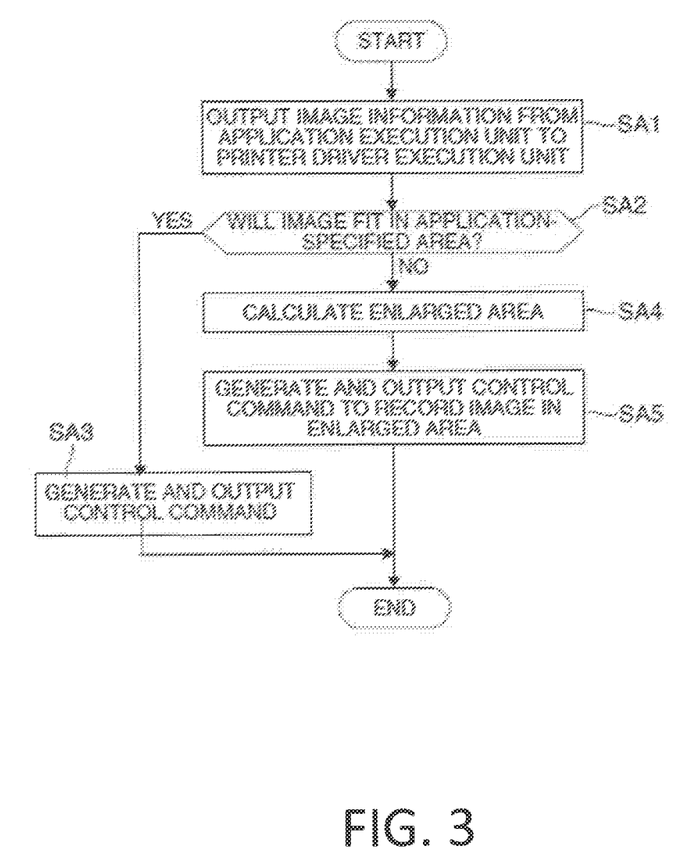
FIG. 3 is a flow chart showing the operation of a host computer.

FIG. 3 is a flow chart showing the operation of the host computer 10 when recording an image on cut-sheet paper.

As shown in FIG. 3, image information is first output from the application execution unit 20 to the printer driver execution unit 21 to record an image on cut-sheet paper (step SA1). As described above, at least the image data for the image to be recorded on cut-sheet paper and information identifying the top, bottom, left, and right margins AU, AB, AL, and AR managed by the application is included in the image information.

When the image information is input, the printer driver execution unit 21 determines whether or not the image represented by the image data will fit in the application-specified area A (step SA2). That the image described by the image data fits in the application-specified area A means, in other words, that the size of the image to be recorded is smaller than the application-specified area A, and whether or not the size of the image described by the image data is larger than the application-specified area A is determined in step SA2. In step SA2 the printer driver execution unit 21 more specifically calculates the horizontal length AX (FIG. 2 (B)) and the vertical length AY (FIG. 2(B)) of the application-specified area A based on the size of the cut-sheet paper and the top, bottom, left, and right margins AU, AB, AL, and AR. The printer driver execution unit 21 then determines whether or not the horizontal length and the vertical length of the image described by the image data are both greater than or equal to the horizontal length AX and vertical length AY of the application-specified area A. The printer driver execution unit 21 determines the image fits in the application-specified area A if both lengths of the image data are less than or equal to the lengths of the application-specified area A, and determines the image does not fit in the application-specified area A if either one of the lengths of the image data is greater than the corresponding length of the application-specified area A.

If the image fits in the application-specified area A (step SA2: YES), the printer driver execution unit 21 generates control commands following the procedure described above based on the image information, outputs to the printer 11 (step SA3), and ends the process.

However, if the image data is determined to not fit in the application-specified area A (step SA2: NO), the printer driver execution unit 21 calculates an enlarged area (described below) based on the image information (step SA4). Part of the image described by the image data will not be recorded when the host computer 10 generates control commands according to the procedure described above and outputs to the printer 11 when the image will not fit in the application-specified area A. The process of step SA4 and step SA5 of this embodiment is an operation that is performed to prevent this from happening. The operation of step SA4 is described more specifically below.

Figure 4:
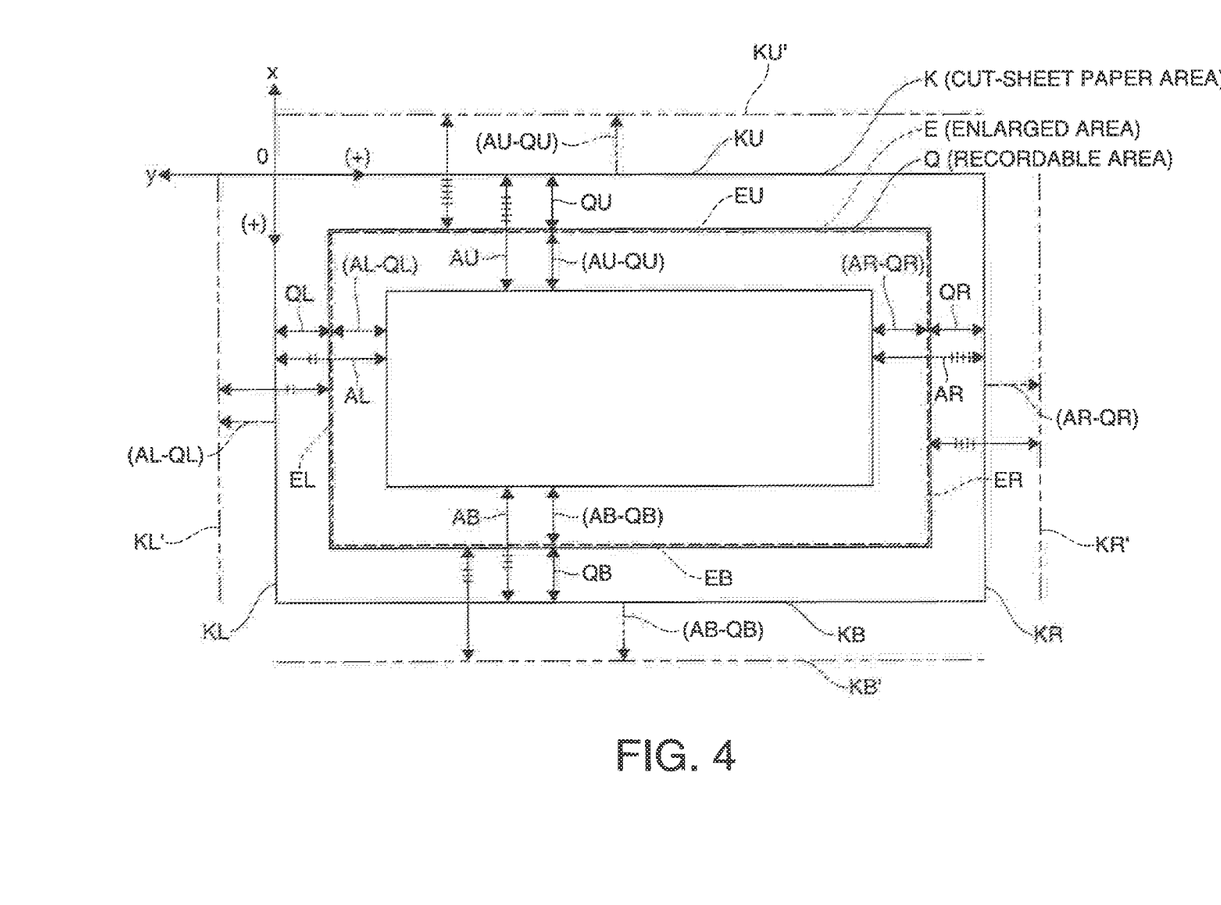
FIG. 4 is used to describe the enlarged area.

FIG. 4 is used to described the area after enlargement. FIG. 4 shows a virtual coordinate system in which the corner of the cut-sheet paper area K at the top left in the figure is the origin O, the axis extending left-right in the figure is the x-axis, and the axis extended up-down in the figure is the y-axis. In this coordinate system the direction to the right on the x-axis in the figure is the positive direction, and the direction toward the bottom on the y-axis in the figure is the positive direction. The printer driver execution unit 21 manages each of the areas described below, the positions of the sides, and the areas using coordinates in this virtual coordinate system. In addition, reference numeral E in FIG. 4 denotes the enlarged area.

The recordable area Q is the largest area to which an image can be recorded. Therefore, when the image does not fit in the application-specified area A, the printer driver execution unit 21 enlarges the application-specified area A to an area equal to the recordable area Q, and can minimize the risk that part of the image will not be recorded if the image is recorded in this enlarged area. This enlarged area is enlarged area E. Based on this, the printer driver execution unit 21 performs the following operation in step SA4.

As shown in FIG. 4, the printer driver execution unit 21 first virtually moves (enlarges) the left side KL of the cut-sheet paper area K in the negative direction on the x-axis an amount equal to the difference between the left application margin AL and the left driver margin QL. This side after being moved is left side KL' below. The printer driver execution unit 21 then defines the side separated from the left side KL' by left application margin AL in the positive direction on the x-axis as left side EL of the enlarged area E. By thus defining the side separated left application margin AL from the left side KL' virtually enlarged by the difference between the left application margin AL and the left driver margin QL as the left side EL of the enlarged area E, the position of the left side EL of the enlarged area E can be moved to the position corresponding to the left side of the recordable area Q.

The printer driver execution unit 21 similarly virtually enlarges the top side KU, bottom side KB, and right side KR of the cut-sheet paper area K in specific directions an amount equal to the difference between the corresponding margin set by the application and the corresponding margin set by the printer driver, and obtains top side KU', bottom side KB', and right side KR'. The printer driver execution unit 21 then defines the sides separated from these enlarged sides by the corresponding application margin as the top side EU, bottom side EB, and right side ER of the enlarged area E. The positions of the top side EU, bottom side EB, and right side ER thus correspond to the top side, bottom side, and right side of the recordable area Q.

The printer driver execution unit 21 next acquires the coordinates of the four corners of the area (=the enlarged area E) defined by the defined top side EU, bottom side EB, left side EL, and right side ER in the coordinate system, and ends the process of step SA4. This enlarged area E is an area corresponding to the recordable area Q.

In the process of calculating the enlarged area E, this embodiment performs a process that does not change the actual values of the top, bottom, left, and right margins set by the application. More specifically, a process that suitably adjusts the margins set by the application based on the difference between the recordable area Q and the application-specified area A, and defines the area obtained by subtracting these adjusted margins from the sides of the cut-sheet paper area K as the enlarged area E, is possible, but this embodiment of the invention does not perform such a process. This is for the following reasons. Specifically, there are many different types of applications, and the sizes of the managed margins may differ by application. Therefore, methods that define the enlarged area E by suitably adjusting the sizes of the margins managed by the application must change the method of adjusting the margins according to the differences in the shapes of the recordable area Q and the application-specified area A, and this complicates the adjustment process. On the other hand, by virtually enlarging the sides of the cut-sheet paper area K according to a constant rule and defining the enlarged area E based on the relationship between the enlarged sides and the sizes of the margins managed by the application, this embodiment does not need to manipulate the values of the margins when calculating the enlarged area E, can suitably calculate the enlarged area E regardless of the application and regardless of the sizes of the margins set by the application, utility is excellent, and processing is efficient. Furthermore, this embodiment of the invention can create an enlarged area E corresponding to the area of the recordable area Q, and can improve processing efficiency, by using the uniform process of virtually enlarging the sides of the cut-sheet paper area K amounts equal to the difference between the margins set by the application and the margins set by the printer driver, and setting the area defined by sides separated by the application margins from these enlarged sides as the enlarged area E.

After acquiring the coordinates of the four corners of the enlarged area E in step SA4, the printer driver execution unit 21 generates control commands, including information indicating the coordinates of the acquired four corners and the image data of the image to be recorded, to record the image described by the image data in the area (=enlarged area E) defined by the coordinates of these four corners, and outputs to the printer 11.

The printer 11 receiving the control commands records the image in the enlarged area E with the means described above. Note that when the printer-side control unit 30 does not support a virtual coordinate system, the printer driver execution unit 21 performs the conversion from the virtual coordinate system to the physical coordinate system of the printer, and then generates commands for printer control.

As described above, when image information is input from the application execution unit 20, and the size of the image indicated by the image data is larger than the application-specified area A, the printer driver execution unit 21 according to this embodiment of the invention virtually enlarges the positions of the sides of the cut-sheet paper area K in a virtual coordinate system, and generates and outputs to the printer 11 control commands for recording the image described by the image data in an enlarged area E, which is an area defined by sides separated by the application margins from these virtually enlarged sides.

By recording the image in an enlarged area E that is larger than the application-specified area A, this embodiment can reduce the risk that part of the image will not be recorded even when the image will not fit in the application-specified area A. More particularly, because in the process of calculating the enlarged area E, this embodiment executes a process that does not change the values of the top, bottom, left, and right margins set by the application, the enlarged area E can be appropriately calculated without executing a process that suitably changes the application settings of the top, bottom, left, and right margins for each of plural different applications, and utility is excellent.

In this embodiment the printer driver execution unit 21 virtually enlarges the sides of the cut-sheet paper area K in a virtual coordinate system so that the enlarged area E corresponds to the shape of the recordable area Q.

Because the enlarged area E thus corresponds to the recordable area Q, the risk that part of the image will not be recorded can be reduced more effectively.

Furthermore, the printer driver execution unit 21 in this embodiment of the invention can create an enlarged area E corresponding to the area of the recordable area Q, and can improve processing efficiency, by using the uniform process of virtually enlarging the sides of the cut-sheet paper area K amounts equal to the difference between the top, bottom, left, and right margins denoted by the image information input from the application execution unit 20, and the top, bottom, left, and right margins managed by the printer driver, and setting the area defined by sides separated by the application margins from these enlarged sides as the enlarged area E.

The foregoing embodiment describes a preferred embodiment of the invention, and can be changed and adapted as desired within the scope of the invention.

For example, the function blocks shown in FIG. 1 can be desirably achieved by the cooperation of hardware and software, and do not imply a specific hardware configuration. The functions of the function blocks in the host computer 10 can also be rendered by separate devices externally connected to the host computer 10. Furthermore, the host computer 10 could be configured to perform operations including the operation described in the flow chart shown in FIG. 3 by running a program stored on an externally connected storage medium.

The invention claimed is:

1. A control device connectable to a recording device that records an image on a recording medium, the control device comprising:

an application execution unit that, to record the image on the recording medium by the recording device, outputs image information including at least information denoting a first margin on the recording medium, and image data for an image to be recorded on the recording medium, by a function of a specific application; and a printer driver execution unit that, based on the image information input from the application execution unit, generates by a function of a printer driver a control command to record an image described by the image data in an application-specified area, which is an area defined by a first side separated by the first margin from a side of the recording medium, and outputs the control command to the recording device, wherein:

if the image data is determined to not fit in the application-specified area when the image information is input from the application execution unit, the printer driver execution unit moves the side of the recording medium to a virtually enlarged side separated by an amount equal to the difference between the first margin and the second margin, generates a control command to record the image described by the image data in an enlarged area, which is defined by a second side separated by the second margin from the virtually enlarged side, and outputs the control command to the recording device, the printer driver execution unit virtually enlarges the side of the recording medium so that the enlarged area becomes an area corresponding to a recordable area, which is the largest area to which an image can be recorded on the recording medium, the recordable area is an area defined by margins managed by the printer driver, and the printer driver execution unit makes the enlarged area an area corresponding to the recordable area by virtually enlarging the side of the recording medium an amount equal to the difference between a margin denoted by the image information input from the application execution unit, and the margin managed by the printer driver.

2. A method of controlling a control device connectable to a recording device that records an image on a recording medium, the control device including an application execution unit that, to record the image on the recording medium by the recording device, outputs image information including at least information denoting a margin on the recording medium, and image data for an image to be recorded on the recording medium, by a function of a specific application, and a printer driver execution unit that, based on the image information input from the application execution unit, generates by a function of a printer driver a control command to record an image described by the image data in an application-specified area managed by the application execution unit, which is an area defined by a side separated by a margin from a side of the recording medium, and outputs the control command to the recording device, the method comprising:

virtually enlarging, if the image data is determined to not fit in the application-specified area when the image information is input from the application execution unit, a position of a side of the recording medium;

generating a control command to record the image described by the image data in an enlarged area managed by the printer driver execution unit, which is an area defined by a side separated by the margin from the virtually enlarged side; and outputting the control command to the recording device, wherein:

the virtually enlarging includes virtually enlarging the side of the recording medium so that the enlarged area becomes an area corresponding to a recordable area, which is the largest area to which an image can be recorded on the recording medium, the recordable area is an area defined by margins managed by the printer driver, and the enlarged area is defined as an area corresponding to the recordable area by virtually enlarging the side of the recording medium an amount equal to the difference between a margin denoted by the image information input from the application execution unit, and the margin managed by the printer driver.

3. A non-transitory computer-readable storage medium storing a program that is executed by a control unit that controls a control device connectable to a recording device that records an image on a recording medium, the program comprising steps of:

outputting image information including at least information denoting a margin on the recording medium, and image data for an image to be recorded on the recording medium, to record the image on the recording medium by the recording device;

based on the image information, generating a control command to record an image described by the image data in an application-specified area managed by an application execution unit, which is an area defined by a side separated by a margin from a side of the recording medium, and outputting the control command to the recording device; and if the image data is determined to not fit in the application-specified area based on the image information, virtually enlarging a position of a side of the recording medium, generating a control command to record the image described by the image data in an enlarged area managed by a printer driver execution unit, which is an area defined by a side separated by the margin from the virtually enlarged side, and outputting the control command to the recording device, wherein:

the virtually enlarging includes virtually enlarging the side of the recording medium so that the enlarged area becomes an area corresponding to a recordable area, which is the largest area to which an image can be recorded on the recording medium, the recordable area is an area defined by margins managed by the printer driver execution unit, and the enlarged area is defined as an area corresponding to the recordable area by virtually enlarging the side of the recording medium an amount equal to the difference between a margin denoted by the image information input from the application execution unit, and the margin managed by the printer driver execution unit.

* * * * *